INVENTOR.
ALFRED WURBS
BY

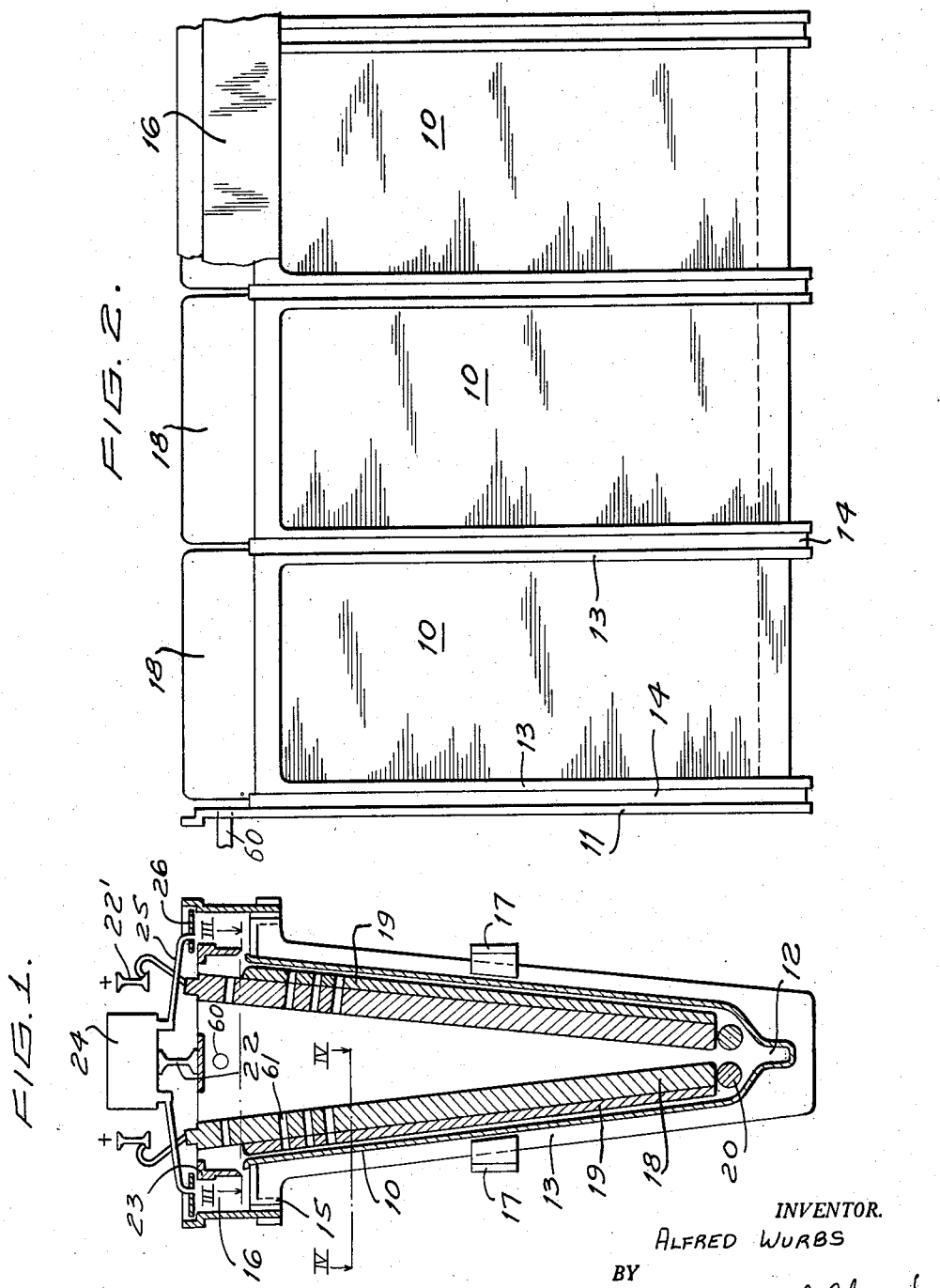

March 3, 1959 A. WURBS 2,876,192
AMALGAM PRODUCING APPARATUS
Filed Aug. 23, 1954 3 Sheets-Sheet 3

INVENTOR.
ALFRED WURBS
BY

United States Patent Office 2,876,192
Patented Mar. 3, 1959

2,876,192

AMALGAM PRODUCING APPARATUS

Alfred Wurbs, Karlsruhe, Germany

Application August 23, 1954, Serial No. 451,601

4 Claims. (Cl. 204—220)

The present invention relates to amalgam producing apparatus, the amalgam formed by the apparatus then being decomposed to produce hydrogen and sodium hydroxide as well as mercury which is used again in the amalgam manufacturing process.

Known apparatus for producing amalgam have several disadvantages. Thus, the known apparatus is extremely bulky and requires large cells as well as considerable space. Attempts have been made to reduce the size of the amalgam manufacturing apparatus, but where the size is reduced more mercury is required for the process so that the advantage obtained by reducing the size of the apparatus is lost by the requirement for more mercury.

One of the objects of the present invention is to provide an amalgam manufacturing apparatus of small size and simple construction and at the same time requiring a very small amount of mercury for the amalgam producing process.

Another object of the present invention is to provide an amalgam manufacturing apparatus whose parts are easily removed and adjustable.

An additional object of the present invention is to provide an amalgam manufacturing apparatus which has the electrical current for the electrolytic process conducted to the solution in an extremely simple manner.

It is also an object of the present invention to provide an exceedingly simple circuit for the solution of metal in mercury which permits the solution to be cleaned of impurities in a very convenient manner.

Also, it is an object of the present invention to provide an extremely simple and efficient means for distributing the solution to different portions of the apparatus in a predetermined sequence.

With the above objects in view, the present invention mainly consists of an amalgam producing apparatus which includes a plurality of trough sections of substantially V-shaped cross section connected together in a row to form an elongated trough and having a pair of end walls respectively located at its opposite ends, this trough having electrically conductive, cathode-forming, metallic side walls making an angle of from 45° to 90° with a horizontal plane. Anode plates are located in the trough at a distance of a few millimeters from the walls thereof. A distributing means communicates with the top of the trough for distributing mercury thereto, and a pump means feeds mercury to the distributing means. A pair of conduits arranged in parallel with respect to each other communicate with the trough and pump for conveying the solution therebetween, and an amalgam decomposer is arranged in only one of the conduits.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Fig. 1 is a transverse sectional elevational view, taken along line I—I of Fig. 3 in the direction of the arrows, showing an amalgam producing apparatus constructed in accordance with the present invention;

Fig. 2 is a fragmentary side elevational view of an amalgam producing apparatus constructed in accordance with the present invention;

Figure 3:
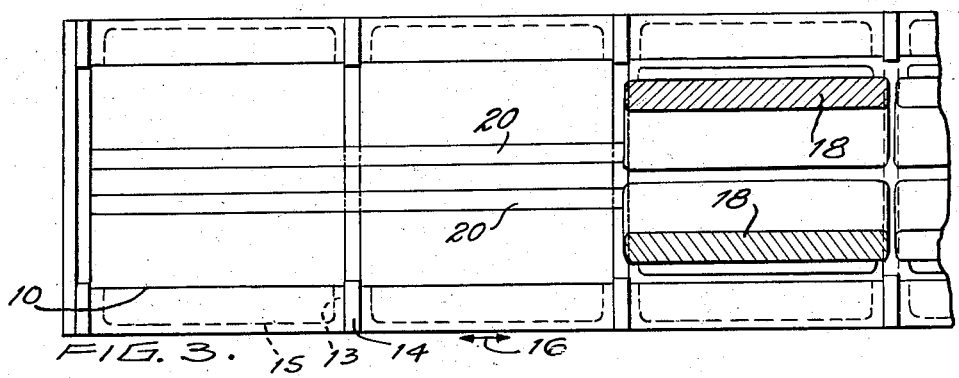
Fig. 3 is a sectional top plan view of the amalgam producing apparatus taken along line III—III of Fig. 1 in the direction of the arrows.
Figure 4:
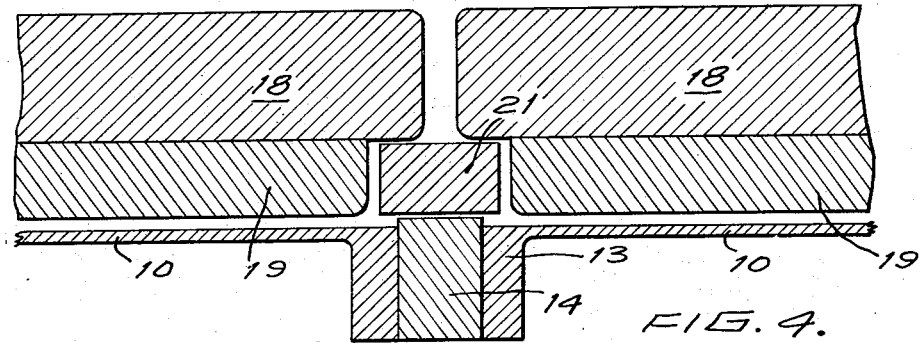
Fig. 4 is an enlarged fragmentary sectional plan view, taken along the line IV—IV of Fig. 1 in the direction of the arrows, illustrating the manner in which anode plates are arranged in the apparatus of the invention.

Referring now to the drawings and to Figs. 1–4 in particular, it will be seen that the apparatus of the invention includes a trough closed at its top to form an enclosure in which the electrolysis takes place. The trough of the invention is substantially V-shaped, as is apparent from Fig. 1, and is made up of a plurality of trough sections arranged in a row, as may be seen from Figs. 2 and 3. Each trough section has a pair of opposite side walls 10 extending upwardly from the bottom of the trough and diverging from each other as they approach the top of the trough. The walls 10 of the trough sections form the cathode of the electrolytic process and may be made, for example, of a low carbon wrought iron.

The trough formed by the several trough sections which are arranged in a row is closed at its opposite ends by a pair of end walls 11. Furthermore, the bottom of the trough is shaped to include a collecting channel 12 for a purpose pointed out below. The walls 10 are inclined to a horizontal plane and make an angle of between 0° and 45° with a vertical plane passing through a lower portion of each wall 10, the inner face of each wall 10 being directed toward this plane. It is preferred that the inclination of each wall 10 be 10 to 1, that is, that each wall 10 be located along the hypotenuse of a right triangle whose vertical leg is approximately 10 times as long as its horizontal leg. Each side wall 10 is formed at its opposite side edges with flanges 13, respectively, and these flanges 13 extend through the entire depth of the trough, as is apparent from Fig. 1. A V-shaped member 14 which may, for example, be made of plastic or the like, is located between each pair of successive trough sections and interconnected with the latter with suitable sealing material so that in this way the trough sections are interconnected in a row to form a continuous trough. The V-shaped members 14 are also located at the ends of the row of trough sections and interconnect the trough with the end walls 11. Each side wall 10 is provided at its top with a flange 15 extending between the side flanges 13, and each side of the trough is provided with a narrow horizontally extending wall 16 extending along the entire length of the trough across the trough sections thereof and connected to the flanges 15, each wall 16 being provided on its inside with a protective coating of rubber, plastic, or the like. It should be noted that the end walls 11 are also protected against corrosion in a known way.

Current is supplied from the bus bars 17, common to all the trough sections to the cathode-forming walls 10 by mounting the bus bars 17 directly on the flanges 13, as shown in Fig. 1.

The anodes of the apparatus of the invention include a plurality of graphite carrier plates 18 each of which has a width approximately equal to that of a wall 10, these carrier plates 18 being respectively located opposite the walls 10. It will be noted that the plates 18 also have a length substantially equal to that of the side walls 10. Each graphite plate 18 may have a thickness of from 50 to 60 millimeters and instead of being composed of a solid one piece plate may be made up of a plurality of assembled plates. The carrier plates 18 are only used for conveying electrical current. Separate electrode plates 19 are provided to be consumed in the electrolytic process. The plates 19 have less thickness than the plates 18 and are removably carried thereby, respectively, for example, through the medium of screws made of graphite or other corrosion-resistant material.

The anode carrier plates 18 rest at their lower end on a support means in the form of bars 20 extending between and connected to the end walls 11 and covered with a corrosion-resistant coating. Also, it is possible for bars 20 to be replaced by a support means in the form of extensions forming part of the V-shaped members 14 and located where bars 20 are located to support the carrier plates 18 at their bottom edges.

The anode plates 19 are located closely adjacent to but spaced from the walls 10, respectively, for example, at a distance of a few millimeters from the walls 10, the anodes 18, 19 being substantially parallel to the walls 10, respectively, as is evident from the drawings. The positioning of the anodes with respect to the cathode-forming walls 10 is determined by spacer bars 21 (Fig. 4), one spacer bar 21 resting against each leg of each V-shaped member 14. The bars 21 are made of a corrosion-resistant electrically non-conductive material and preferably have a rectangular cross section. Inasmuch as the bars 21 simply rest against the V-shaped members 14, they are easily exchangeable for different bar members of different thicknesses, and the thickness of the bar members 21 is chosen so as to locate the plates 19 at the above-mentioned distance of a few millimeters from the walls 10 of the trough sections. Thus, as the plates 19 become consumed and their thickness decreases, bars 21 of a smaller thickness may be mounted on the apparatus to adjust the space between walls 10 and anode plates 19. It will be noted from Fig. 4 in particular that the anode carrier plates 18 are wider than plates 19 and rest against the inner face of bars 21 which are located between the anode plates 19.

The upper portions of the anode plates 18, 19 are formed with bores 60 to provide a passage through which chlorine and brine may flow to the center of the cell and through which the electrolyte may circulate under the action of a pressure differential at the space between the electrodes, on the one hand, and at the center of the trough, on the other hand.

Chlorine is withdrawn through the tube 61 shown in Figs. 1 and 2.

The top ends of carrier plates 18 are electrically connected to bus bars 22' feeding the anode current to the anode plates. Moreover, the tops of the carrier plates 18 are provided with projections which respectively extend through and fill openings in a cover plate 23 carrying bar 22 and having downwardly extending side flanges which may extend into a liquid seal formed by liquid located on the top of plates 10 between the narrow side walls 16 and the anodes 18, 19. A distributor 24 (Fig. 1) is carried by bar 22 and distributes mercury and solution of metal in mercury resp. received from a supply pump to the individual trough sections through conduits 25 diagrammatically shown in Fig. 1 and passing through openings in plates 26 which rest on a shoulder of the side walls 16 and on the cover 23, so that the amalgam producing apparatus forms a closed enclosure in which the electrolytic process takes place. This solution is distributed to different portions of the trough in a predetermined sequence. The amalgam formed in the cell is entirely or preferably partially conveyed through a decomposer to obtain from the amalgam hydrogen and sodium hydroxide, and the mercury left over is returned to the cell in a continuous circuit.

Figure 9:
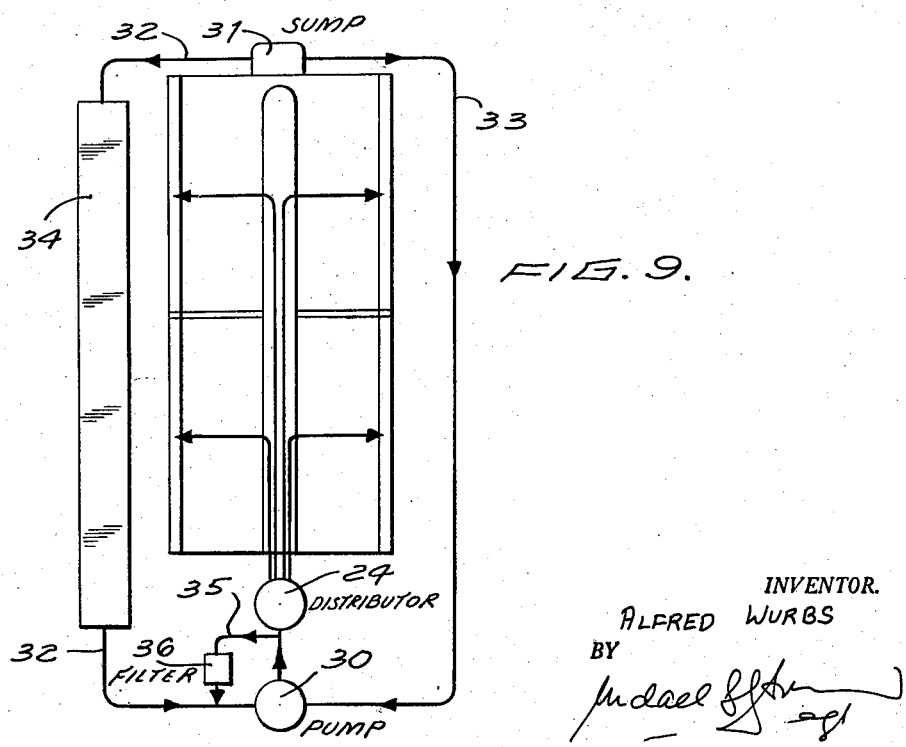
Fig. 9 is a diagrammatic illustration of the circuit through which the solution moves in accordance with the present invention, Fig. 9 also illustrating where such units as the pump, the decomposer, and the solution cleaner are located in the circuit.

The circuit of the present invention is illustrated diagrammatically in Fig. 9. Thus, Fig. 9 shows the pump 30 which communicates with the distributor 24 which distributes the mercury to four trough sections, for example, intermittently and pulsatingly in a predetermined sequence. After the mercury in the trough has had its sodium content increased by the electrolytic process, the mercury gathers in the collecting channel 12 and is conveyed from the latter to a collecting sump 31 mounted on one of the end walls 11 and communicating with channel 12. From the sump 31 the solution is conveyed in opposite directions along a pair of conduits 32 and 33 arranged in parallel with respect to each other. Only the conduit 32 has a decomposer 34 located therein, and from this decomposer the portion of the solution flowing along conduit 32 returns to the pump 30, the decomposer simply returning mercury to the pump 30. The solution flowing along conduit 33 simply returns in unchanged condition back to the pump 30, and the two streams are united at pump 30 and are returned to the distributor 24. A conduit 35 communicates with the pressure and suction sides of the pump 30 and carries a cleaning means 36 for cleaning the solution. Thus, this cleaning means 36 may take the form of a ceramic filter, or, instead of such a filter a mercury sump may be provided in which the impurities (amalgam butter) float to the top of the solution where they may easily be skimmed off.

Figure 5:
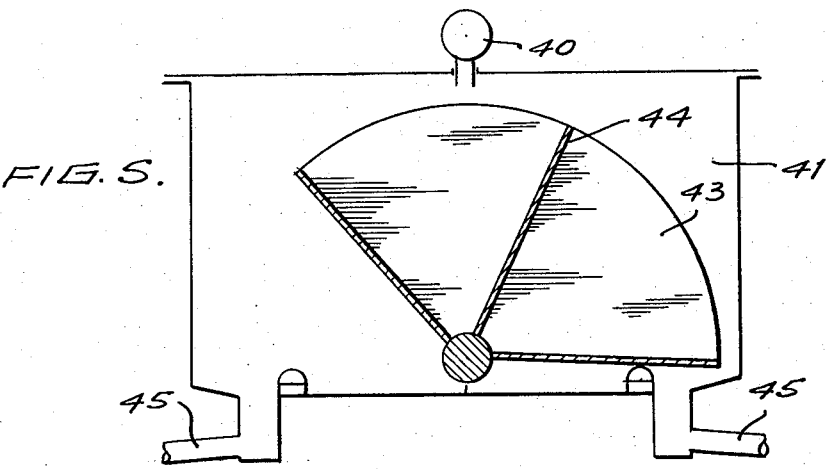
Fig. 5 is a fragmentary elevational partly diagrammatic and partly sectional view of a distributor for distributing solution to the amalgam producing apparatus.
Figure 6:
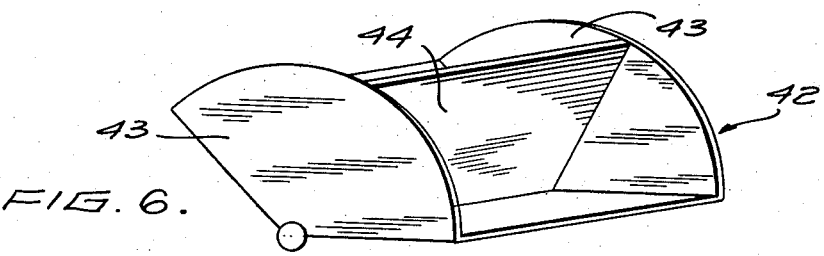
Fig. 6 is a perspective view of a tiltable unit of the distributor of Fig. 5.
Figure 7:
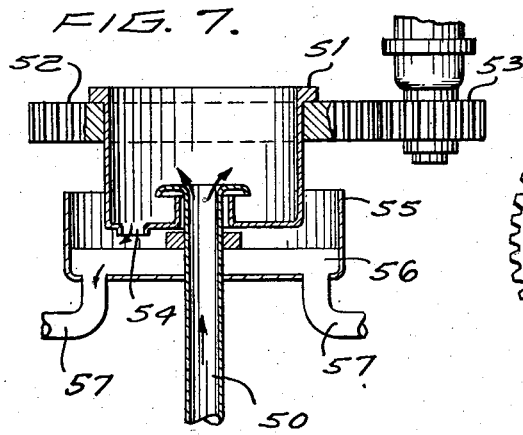
Fig. 7 is a fragmentary partly sectional elevational view of a different embodiment of a distributor for distributing solution to the amalgam producing apparatus.
Figure 8:
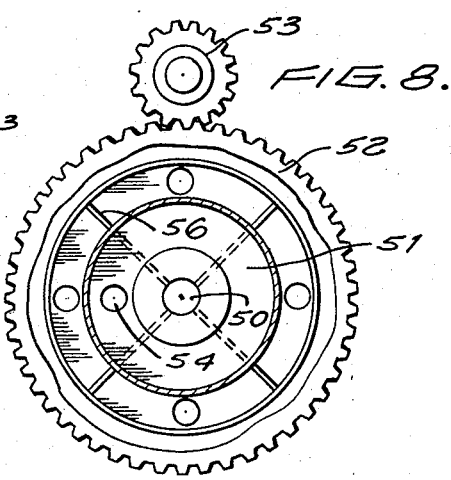
Fig. 8 is a top plan view of the structure of Fig. 7.

Figs. 5 and 6 show one possible construction for the distributor 24, while Figs. 7 and 8 show another possible distributor 24. Referring to Figs. 5 and 6, it will be seen that a conduit 40 from the pump 30 delivers the solution to the interior of a container 41. The end walls of the container 41 tiltably support an elongated channel 42 of sector-shaped cross section having the end walls 43 and divided into two compartments by a partition 44. The bottom wall of the container 41 communicates through suitable openings with conduits 45 leading to the several trough sections. Thus, referring to Fig. 5, it will be seen that while the right compartment of channel 42 is emptying, the left compartment is located beneath the outlet of conduit 40 and is being filled. This process continues until the center of gravity of the channel member 42 shifts to the left sufficiently to cause the member 42 to tilt to the left, as viewed in Fig. 5, and at this time the left compartment empties to the left conduits 45 of Fig. 5 while the right conduit 43 is being filled. Thus, in a completely automatic manner the solution is distributed intermittently to opposite sides of the trough. With the distributor of Figs. 7 and 8, the conduit 50 leading from the pump delivers the mercury to the interior of a container 51 which is coaxial with conduit 50 and which is mounted for turning movement thereabout. Container 51 is fixed along its outer surface to the inner periphery of a ring gear 52 which meshes with a pinion 53 driven by any suitable motor or the like. The ring gear 52 is broken away in Fig. 8 to show the structure located beneath the ring gear. The container 51 is formed with an outlet 54 in its bottom wall and is located within a second container 55 divided by partitions 56 into quadrant-shaped compartments respectively communicating at their bottom wall portions with conduits 57 respectively leading to the several trough sections. Thus, as the container 51 rotates the outlet 54 will successively communicate with the several quadrants of container 55 so that the solution will in this way be distributed in a predetermined sequence to the different parts of the apparatus.

As is evident from the above discussion, those parts of the apparatus which are subject to corrosion and which are not essential to the electrical circuit may be provided with a suitable coating to protect the apparatus against corrosion.

Each of the side walls 10 may, for example, have a width of from between ½ to 1 meter and it will be noted that the distributor distributes the solution in a pulsating intermittent manner to the spaces between the electrodes. This arrangement produces the advantages of:

(1) An even distribution of the mercury in the individual sections, (2) Within each section the mercury is distributed across the whole width of the section, (3) The total cathode area is uniformly flooded and (4) From time to time the tendency of particles to float in the mercury increases to prevent formation of deposits on the cathode surfaces. Furthermore, a suitable conduit may be provided to supply brine to a lower portion of the electrolytic cell, and a suitable overflow pipe may be provided to carry off the brine overflow.

Instead of low carbon wrought iron, the trough sections may be made of any metal which is amalgamizable by mercury or alkali-amalgam or from plates of such metal or alloys thereof. It will be noted also that the electrically non-conductive V-shaped members 14 and bars 21 separate the different parts of the electrolytic cell from each other so that they operate independently. The current led to and away from the ends of the electrolytic cell is distributed to the individual cathodes and to the individual anodes by the above-mentioned bus bars which may each be in the form of a closed bus bar frame so that the current is uniformly distributed to the apparatus. The division of the cell into several sections having the above-mentioned width of ½ to 1 meter produces an extremely reliable mercury distribution in spite of the relatively small size of the apparatus as a result of the above-described arrangement as well as a result of the distribution of the mercury in an intermittent manner to the several cathodes. By leading only part of the amalgam to the decomposer, as shown in Fig. 9, a higher amalgam concentration is obtained. Furthermore, the apparatus includes a regulating device located in the conduit 35 connected to the suction and pressure sides of the pump 30 as shown in Fig. 9.

It will be understood that each of the elements described above, or two or more together, may also find a useful application in other types of amalgam producing apparatus differing from the types described above.

While the invention has been illustrated and described as embodied in amalgam producing apparatus and mercury distributors therefor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an amalgam producing apparatus, in combination, an elongated, electrically conductive cathode-forming trough of substantially V-shaped cross section including a plurality of trough portions; anode plates located in said trough closely adjacent to but spaced from the walls thereof and defining therewith spaces of said trough portions, respectively, in which a solution is adapted to flow downwardly; pump means for pumping said solution; and distributor means communicating with said pump means for receiving the solution therefrom and communicating with said spaces of said trough portions, respectively, for directing the solution thereto in sequence, said distributor means directing the solution to the space of only one trough portion at any given time, and said pump means and distributor means cooperating to deliver to each trough portion an amount of solution great enough to maintain a continuous flow of solution in the space thereof, so that the flow of solution in the space of any one trough portion does not stop during the time when said distributor means is not directing solution to the latter trough portion, whereby there is at least momentarily a head of solution communicating with the space of each trough portion and consequently a surge of flow in each space greater than that which would be provided by the same output of said pump means with simultaneous distribution of the solution to said trough portions.

2. In an amalgam producing apparatus as recited in claim 1, said trough being composed of a plurality of trough sections of substantially V-shaped cross section arranged in a row, a plurality of substantially V-shaped members of rectangular cross section respectively located between and interconnecting each pair of successive trough sections, a plurality of elongated bars located in said trough respectively against the legs of said V-shaped members, and said anode plates resting against said bars, the latter holding said plates closely adjacent to but spaced from said walls.

3. In an amalgam producing apparatus as recited in claim 1, said trough portions being opposite sides of said trough and said distributor means including a receiver communicating with said pump means and having a pair of laterally arranged solution receiving compartments, said receiver being mounted for automatic tilting movement in opposite directions when one or the other of said compartments are filled, and said distributor means including a conduit communicating with one side of said trough and with one of said compartments when said receiver tilts in one direction and a second conduit communicating with the other side of said trough and with the other of said compartments when said receiver tilts in the opposite direction.

4. In an amalgam producing apparatus as recited in claim 1, said distributor means including a rotatably mounted container receiving the solution from said pump means and formed with a single outlet, and a plurality of conduits respectively communicating with said plurality of trough portions and communicating successively with said outlet during rotation of said container.

References Cited in the file of this patent

UNITED STATES PATENTS

| 501,783 | Hermite | July 18, 1893 |
| 733,643 | Gurwitsch | July 14, 1903 |
| 756,327 | Carkeek | Apr. 5, 1904 |
| 2,351,383 | Wolf | June 13, 1944 |
| 2,598,228 | Cox | May 27, 1952 |

FOREIGN PATENTS

| 20,768 | Great Britain | Dec. 19, 1890 |
| 362,988 | Great Britain | Dec. 14, 1931 |
| 490,911 | Great Britain | Aug. 23, 1938 |
| 665,225 | Great Britain | Jan. 16, 1952 |

OTHER REFERENCES

Fiat Report #831, June 17, 1946, pages 7, 8 and 24.